No. 862,280. PATENTED AUG. 6, 1907.
M. L. PRATT-CHADWICK.
SKIRT GAGE.
APPLICATION FILED DEC. 17, 1906.
2 SHEETS—SHEET 1.
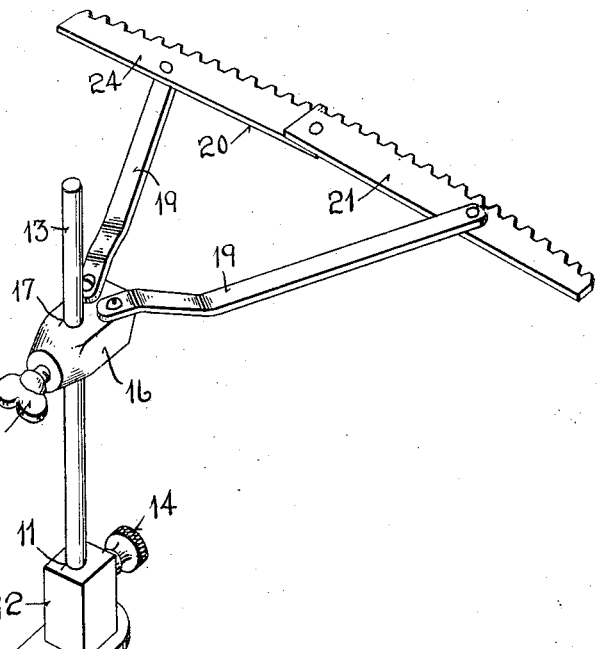
Fig. 1.
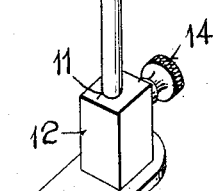
Fig. 3.
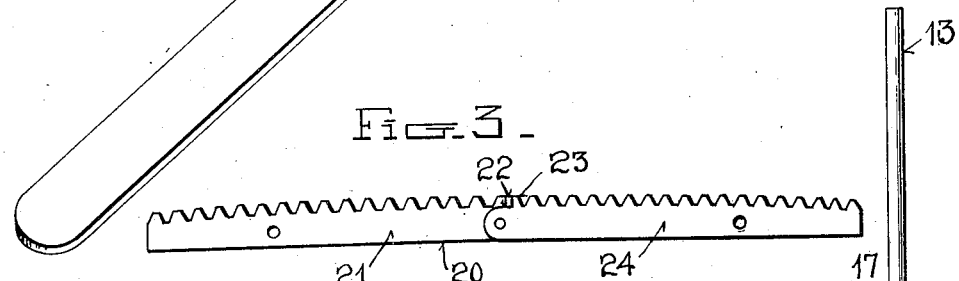
Fig. 2.
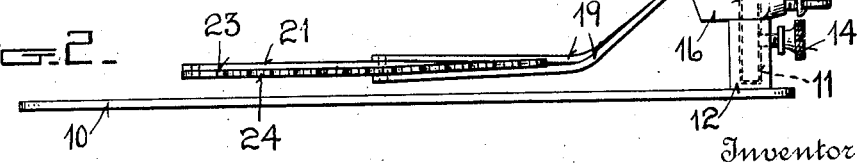
Witnesses
L. B. James
C. H. Griesbauer.
Inventor
M. L. Pratt-Chadwick
by H. B. Willson & Co.
Attorneys
THE NORRIS PETERS CO., WASHINGTON, D. C.

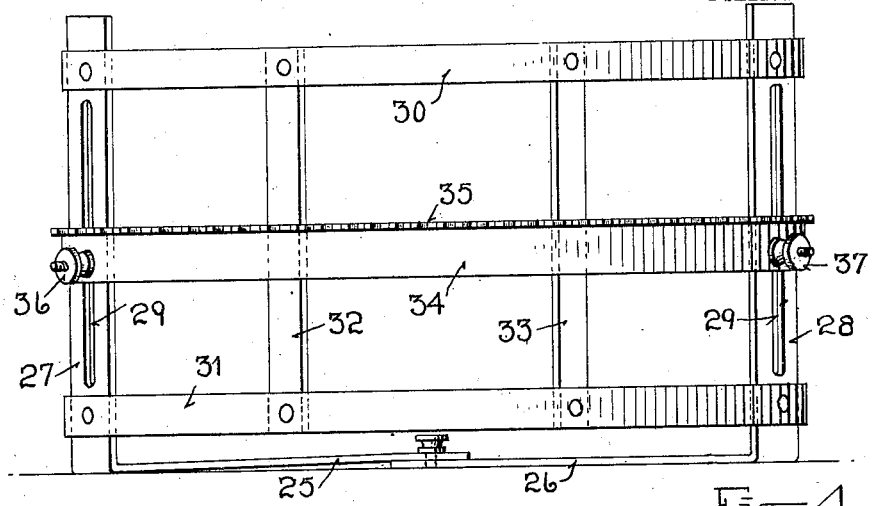
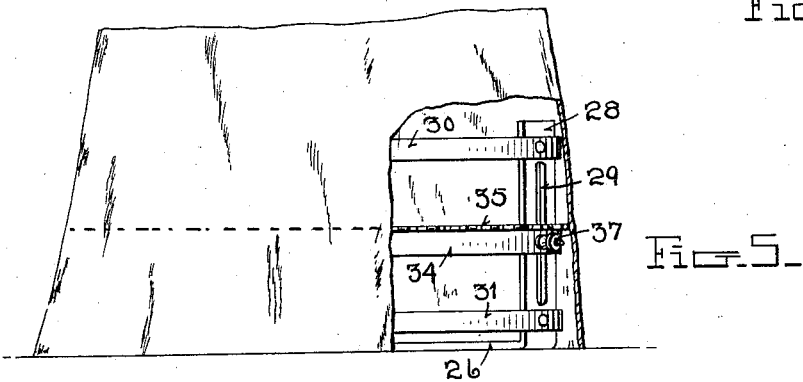
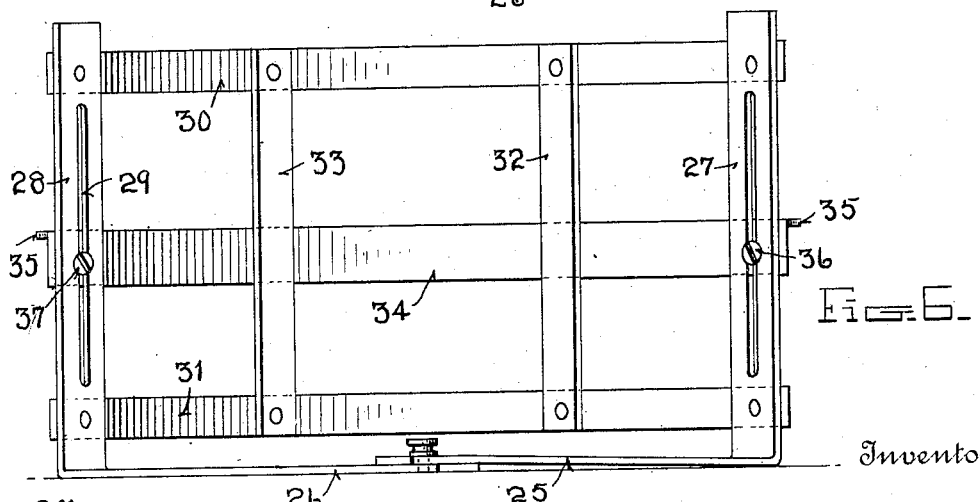

UNITED STATES PATENT OFFICE.

MARA L. PRATT-CHADWICK, OF MALDEN, MASSACHUSETTS.

SKIRT-GAGE.

No. 862,280.   Specification of Letters Patent.   Patented Aug. 6, 1907.

Application filed December 17, 1906. Serial No. 348,274.

*To all whom it may concern:*

Be it known that I, MARA L. PRATT-CHADWICK, a citizeness of the United States, residing at Malden, in the county of Middlesex and State of Massachusetts, have invented certain new and useful Improvements in Skirt-Gages; and I do declare the following to be a full, clear, and exact description of the invention, such as will enable others skilled in the art to which it appertains to make and use the same.

This invention relates to a skirt gage for measuring the length of a skirt.

The object of the invention is to provide a skirt gage having a firm foundation, against which the chalk may bear, so that the line marked on the goods is clear-cut, accurate, and the same distance from the floor all the way round.

In the accompanying drawings,—Figure 1 represents a perspective view of one form of the invention; Fig. 2 represents a side elevation of the device in folded position; Fig. 3 represents a top plan view of the toothed marking member detached; Fig. 4 represents a front elevation of another form of gage; Fig. 5 represents a front elevation of the form shown in Fig. 4, applied; and Fig. 6 represents a rear elevation of the form shown in Figs. 4 and 5.

In the embodiment illustrated in Figs. 1 to 3, is shown a base member or platform, preferably in the form of a flat, metal bar 10, having a socket post at one end with a socket 12 therein on its upper face. A spindle 13 rests in said socket 11 and is detachably held therein by a set-screw 14. A marking member is slidably mounted on said spindle, and, as shown, comprises a block 16 having an aperture 17, through which the spindle 13 is passed and with a screw-threaded aperture extending transversely thereof to receive a set-screw 18 for clamping said block in adjusted position on the spindle. This block 16 has two laterally-extending arms, as 19, pivoted thereto, and with the free ends thereof diverging. To the free ends of these diverging arms 19 is pivoted a bar 20 having teeth on its outer edge. This bar is preferably hinged at its center to fold laterally, as shown in Fig. 2, and the member 21 thereof has a straight end with a depending lug 22 at its outer edge to engage the last tooth 23 on the other member 24, the end of the member 24 being preferably rounded at its hinged end and with a tooth 23 spaced therefrom. When the members 21 and 24 are extended, the lug 22 engages the tooth 23 and locks the members in open position. The outer toothed edge of the bar 20 is preferably reduced or inclined toward its free ends to form a curved toothed edge to conform somewhat to the shape of the skirt.

When the device is not in use, the block 16 may be lowered onto the socket post 11 and the hinged members 21 and 24 folded. If desired to further economize space, the spindle 12 may be detached from the socket 12.

In the use of this device, the person whose skirt is to be measured for a hem stands on the base bar 10, which holds the gage firmly against movement and the skirt is hung outside the spindle over the toothed bar, the device being wholly covered by the skirt. The person measuring then steadies the material with one hand and draws the chalk against the skirt opposite the toothed bar, by which means a perfectly clear-cut dotted line is made. This line indicates the point where the skirt is to be turned up.

In the form shown in Figs. 4 to 6, a supporting bar or platform is formed of two flat bars 25 and 26, pivotally connected at one end and with their free ends diverging and bent upwardly at right angles to form standards 27 and 28. These standards are slotted throughout the greater portion of their length at 29, and are preferably connected near their upper ends by a cross-bar 30 and at their lower ends by a cross-bar 31. These cross-bars are connected by vertically-disposed, spaced bars 32 and 33. This supporting frame is preferably made segmental to conform to the shape of the skirt. The marking bar in this instance is composed of a strip 34 of metal or other suitable material, having laterally-projecting, spaced teeth 35 thereon. The ends of this strip are slidably and adjustably mounted in the slotted standards 27 and 28, by means of set-screws 36 and 37.

These gages may be made of any suitable material, and of any desired height. They are preferably made about two feet high and about eighteen inches wide to adapt them for use in measuring chlildren's dresses, men's and women's coats and similar garments.

I claim as my invention,—

1. A skirt gage comprising a supporting base having means for supporting a vertically-slidable, horizontally-disposed marking member, said member being provided with outwardly-extending spaced teeth, and means for locking said marking member at any desired height.

2. A skirt gage comprising a base member on which the person whose skirt is to be measured is adapted to stand, an upright member on said base member, and a horizontally-disposed marking bar vertically slidable on said upright member and having means for locking it thereto at any desired point.

3. A skirt gage comprising a base member having an extension on which the person whose skirt is to be measured is adapted to stand, an upright at one end thereof, and a horizontally-disposed, outwardly-extending marking bar vertically adjustable on said upright and having laterally-extending spaced projections on its outer edge, whereby a dotted line may be marked on the skirt.

4. A skirt gage comprising a supporting base having a vertically-adjustable, horizontally-disposed marking member thereon provided with spaced blunt-pointed teeth.

5. A skirt gage comprising a base member having a socket at its front end, an upright detachably mounted in said socket, a detachable marking member slidable on said upright and having means for locking it at any desired point thereon, said marking member having a forwardly-projecting toothed plate at its front edge.

6. A skirt gage comprising a base member having a socket at its front end, an upright detachably mounted in said socket, a detachable marking member slidable on said upright and having means for locking it at any desired point thereon, said marking member having a toothed plate at its front edge and said plate being foldable intermediate its ends and provided with means for holding it in open position.

In testimony whereof I have hereunto set my hand in presence of two subscribing witnesses.

MARA L. PRATT-CHADWICK.

Witnesses:
EMMA H. GREENE,
ELLA M. HYDE.